United States Patent [19]

Bucalo

[11] 3,841,408
[45] Oct. 15, 1974

[54] HORSESHOES

[75] Inventor: Louis Bucalo, Holbrook, N.Y.

[73] Assignee: Shods, Inc., New York, N.Y.

[22] Filed: Feb. 5, 1973

[21] Appl. No.: 329,861

[52] U.S. Cl............................ 168/7, 168/8, 168/24
[51] Int. Cl................................................ A01l 1/04
[58] Field of Search ........................ 168/7, 4, 24, 8

[56] References Cited
UNITED STATES PATENTS

| | | | |
|---|---|---|---|
| 526,049 | 9/1894 | Poupard | 168/7 |
| 526,051 | 9/1894 | Poupard | 168/7 |
| 612,200 | 10/1898 | Gray | 168/7 |
| 1,716,410 | 6/1929 | Austermann | 168/7 |
| 3,090,718 | 5/1963 | Dixon | 168/7 |

FOREIGN PATENTS OR APPLICATIONS 1,191,625   4/1965   Germany ............................ 168/4

Primary Examiner—Louis G. Mancene
Assistant Examiner—J. Q. Lever
Attorney, Agent, or Firm—Steinberg & Blake

[57] ABSTRACT

A horseshoe which is capable of expanding and contracting while being fastened to a hoof. The horseshoe includes a series of portions connected one to the next to form the entire horseshoe which is of a substantially U-shaped configuration with these portions being connected to each other so that they are capable of moving one with respect to the other in a substantially radial direction with respect to a central area around which the horseshoe extends. In this way it is possible for the horseshoe to expand and contract in response to impact forces, and at the same time it is possible for the horseshoe to expand during growth of the hoof.

7 Claims, 12 Drawing Figures

PATENTED OCT 15 1974 3,841,408
SHEET 1 OF 2

HORSESHOES

BACKGROUND OF THE INVENTION

The present invention relates to horseshoes.

Conventional horseshoes are made of elongated bodies of substantially U-shaped configuration, and these bodies are conventionally rigid bodies. Because of this construction a series of problems are encountered in connection with conventional horseshoes. Thus, while the wall of a hoof grows, it is not possible for the conventional rigid horseshoe to expand with the increasing size of the hoof, so that as a result undesirable stresses are created, often resulting not only in injury to the animal but also in loosening of the horseshoe.

In addition, during use of a horseshoe it encounters very substantial impact forces which may be on the order of 2000 pounds at each hoof. Because the hoof itself contracts and expands due to these impact forces, stresses are created between the hoof and a rigid horseshoe attached thereto. The result is that under these conditions there are also shock loads transmitted into the legs of the animal causing muscular strain, fatigue, and leading to physiological problems.

Because the wall of the hoof is intended to be flexible under load and conventional shoes are rigid, high shear forces are created at the interface between the shoe and the hoof, resulting in loosening of nails and rendering bonding of the shoe to the hoof ineffective.

Thus, particular problems are encountered because with conventional horseshoes, bending of the horseshoes cannot take place and selection of a horseshoe of proper characteristics cannot be made.

SUMMARY OF THE INVENTION

It is accordingly a primary object of the present invention to provide a horseshoe which will avoid the above drawbacks.

In particular, it is an object of the invention to provide a horseshoe which is capable of flexing in response to impact so that it will follow the expansion and contraction of the hoof to greatly reduce if not entirely eliminate stresses of the type encountered with conventional horseshoes under impact loads.

Furthermore it is an object of the present invention to provide a horseshoe which is capable of expanding while the wall of the hoof grows so that the horseshoe will conform to the hoof even if the latter should undergo a substantial amount of growth while the horseshoe remains attached to the hoof.

Furthermore, it is an object of the present invention to provide a horseshoe of simple relatively inexpensive construction which is capable of being readily attached to a hoof, as by nails, for example, while at the same time avoiding all of the problems previously encountered with conventional horseshoes.

According to the invention the horseshoe includes an elongated means of substantially U-shaped configuration composed of a plurality of portions which are arranged in a series along the elongated means one next to the other, with these portions being connected to each other so that they are capable of moving one with respect to the other radially away from and radially toward a central area around which the elongated means extends.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
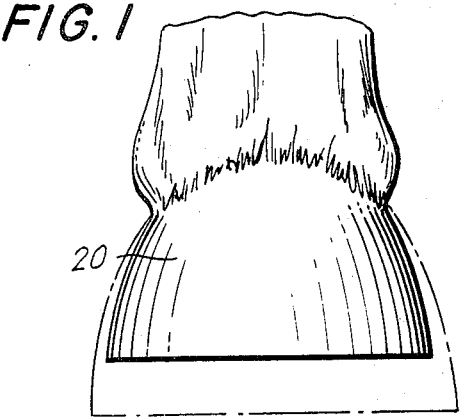
FIGS. 1 and 2 are schematic front and side views of a hoof showing the manner in which it expands during growth.
Figure 2:
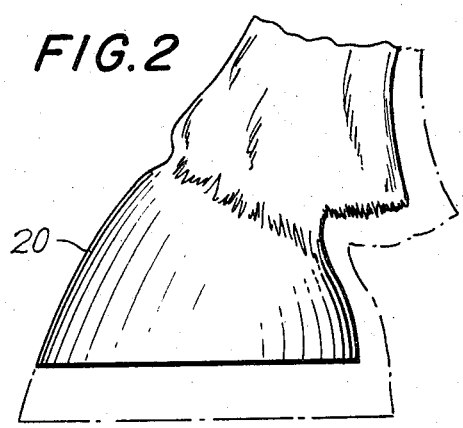

Referring to FIGS. 1 and 2, there is illustrated therein a hoof 20 which is shown in solid lines in a condition it has before it grows to the size indicated by the dot-dash lines. Thus, while the length of the hoof 20 increases to the length indicated by the dot-dash lines, the hoof also widens in the manner shown in FIG. 1 and expands forwardly and rearwardly, in the manner shown in FIG. 2.

Figure 3:
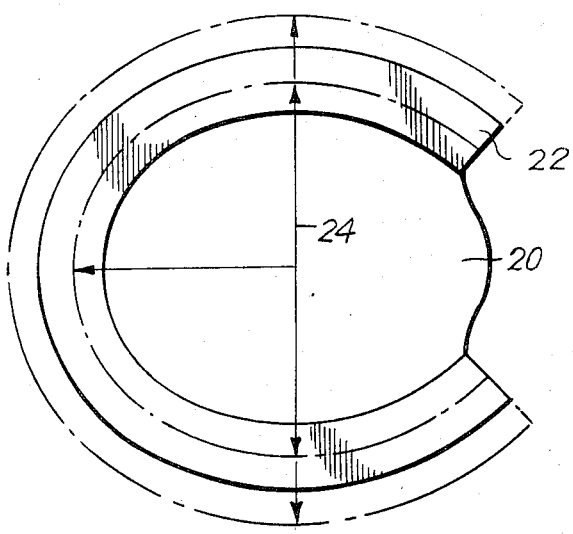
FIG. 3 is a bottom plan view of the hoof of FIGS. 1 and 2 further illustrating the action which takes place during growth.

As may be seen from FIG. 3, the hoof 20 has a wall 22 which during the growth illustrated in FIGS. 1 and 2 expands substantially radially, as indicated by the arrows 24 from the size shown in solid lines in FIG. 3 to the size shown in dot-dash lines.

When a rigid horseshoe is fixed to a hoof 20 when it has the solid-line size and configuration shown in FIGS. 1–3, it is not possible for the rigid horseshoe to expand with the growing hoof, so that when the hoof reaches the size shown in dot-dash lines in FIGS. 1–3, the horseshoe, which remains the same size and shape as when attached to the hoof 20 in the solid line condition, cannot expand with the hoof, so as to create problems as referred to above.

Figure 4:
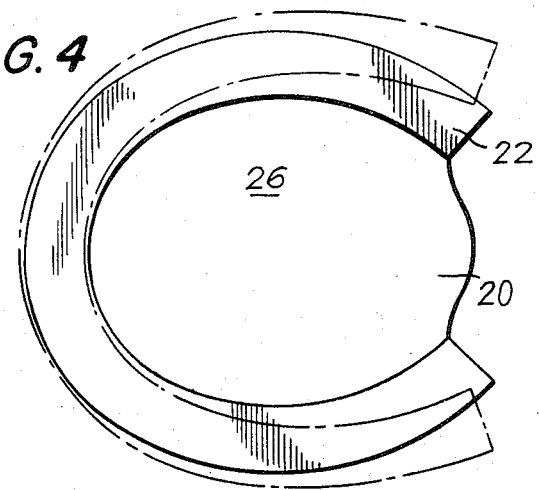
FIG. 4 is a bottom plan view of a hoof illustrating the action which takes place during impact.

Furthermore, during running, for example, the hoof has a considerable impact with respect to the ground. Thus, FIG. 4 shows a hoof 20 in solid lines before impact with the ground and in dot-dash lines upon impact. It will be seen that the wall 22 upon impact expands radially with respect to a central area 26 from the solid to the dot-dash line condition, and immediately after the impact the wall 22 contracts back to the solid line condition shown in FIG. 4. Since conventional horseshoes cannot follow this expansion and contraction which takes place during impact, further problems are created as pointed out above.

Figure 5:
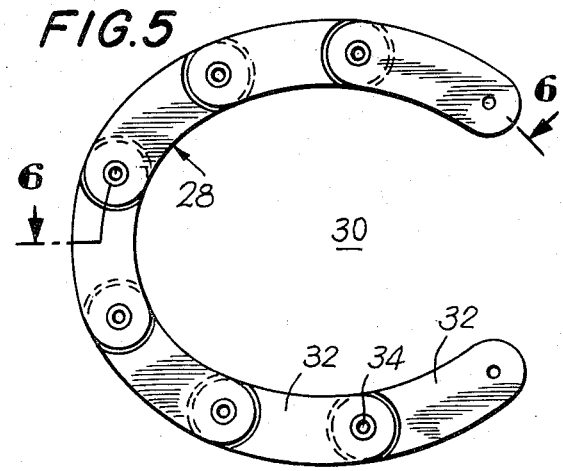
FIG. 5 is an illustration of one embodiment of a horseshoe according to the invention.
Figure 6:
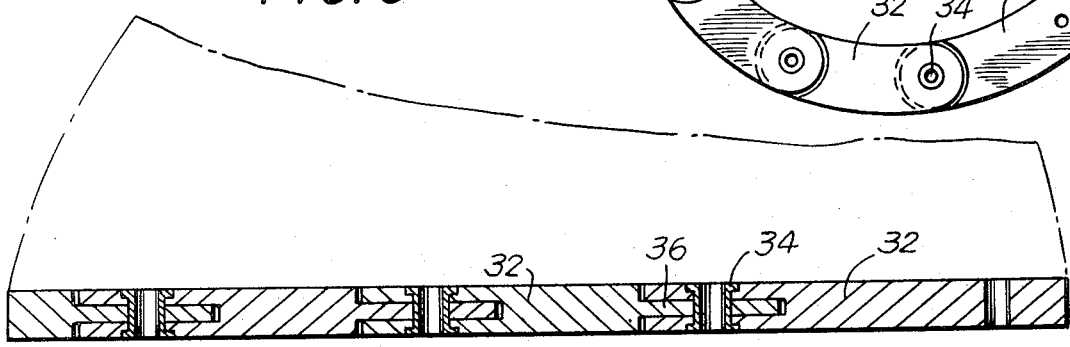
FIG. 6 is a longitudinal sectional elevation taken along line 6—6 of FIG. 5 in the direction of the arrows showing further details of the horseshoe of FIG. 5 and showing in phantom lines how it is attached to a hoof.

The above problems are solved by the horseshoes according to the present invention. One embodiment of a horseshoe according to the invention is illustrated in FIGS. 5 and 6. Thus, it will be seen that the horseshoe of FIGS. 5 and 6 is in the form of an elongated means 28 of substantially U-shaped configuration extending around a central area 30 which is in alignment with the area 26 shown in FIG. 4 when the horseshoe is attached to the hoof 20. This elongated means 28 is made up of a plurality of portions 32 each of which is of an arcuate configuration. These portions 32 are interconnected one with the next in such a way that they are capable of moving with respect to each other radially away from as well as radially toward the central area 30 in order to alleviate the above problems. Thus, the successive portions 32 are hingedly connected to each other, in accordance with this embodiment of the invention, by tubular hinges 34. As may be seen from FIG. 6, each portion 32 has at one end a tongue 36 received in a slot of an overlapping portion 32, and the overlapping end regions of the portions 32 are formed with aligned openings which receive the tubular hinge pins 34. Because these hinge pins are tubular it is possible for nails to extend therethrough in order to fasten the horseshoe 28 to a hoof as indicated in dot-dash lines in FIG. 6. Thus, it will be seen that except for the pair of opposed free end portions 32 shown at the right in FIG. 5, all of the series of portions 32 are identical and are connected one to the next in an identical manner with the entire horseshoe consisting of the identically interconnected identical portions 32 situated between the pair of opposed free end portions 32 which differ from the remaining portions 32 only in that the free extremities of the pair of opposed free end portions 32 are not formed with tongues 36 and instead are formed with simple openings passing therethrough as illustrated.

As a result of the above construction shown in FIGS. 5 and 6, it is possible for each arcuate portion 32 of the elongated means 28 to swing with respect to the adjoining portions 32 thus providing a horseshoe composed of substantially rigid portions which nevertheless are capable of moving with respect to each other to conform to the growth of a hoof as shown in FIGS. 1 – 3 as well as to impact forces as shown in FIG. 4.

Figure 7:
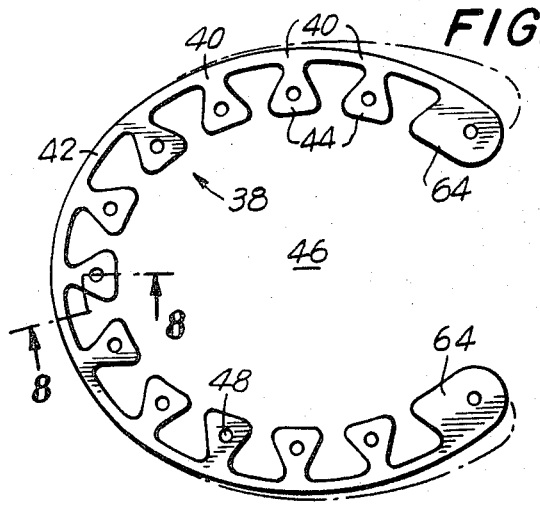
FIG. 7 is an illustration of another embodiment of a horseshoe according to the invention.
Figure 8:
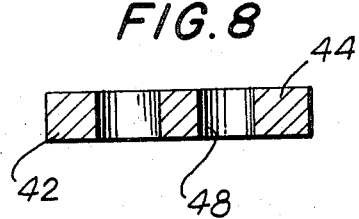
FIG. 8 is a transverse section of the horseshoe of FIG. 7 taken along line 8—8 of FIG. 7 in the direction of the arrows and showing the structure at a scale which is enlarged as compared to FIG. 7.

According to the embodiment of the invention which is illustrated in FIGS. 7 and 8, the elongated means 38 which forms the horseshoe of this embodiment is composed of a plurality of elongated portions 40 which are integrally connected one with the next and together form an elongated continuous springy metal band 42 having a thickness which may be as illustrated in FIG. 8. Each portion 40 has as a part thereof an integral lug 44 extending inwardly from the band 42 between the latter and the central area 46 surrounded by the elongated means 38. These lugs 44 which are of a substantially triangular configuration are respectively formed with openings 48 through which nails may extend for fastening the horseshoe to a hoof. Because of the springy nature of the continuous band 42 it is possible also for this horseshoe of FIGS. 7 and 8 to expand and contract substantially radially with respect to the central area 46 so as to solve the above problems described in connection with FIGS. 1–4.

Figure 9:
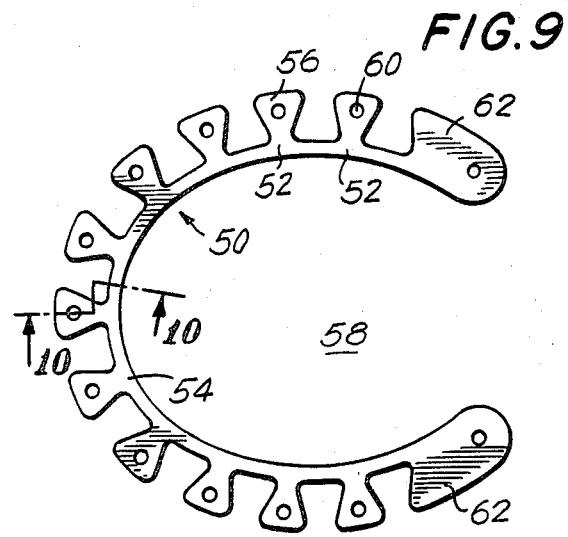
FIG. 9 is an illustration of a third embodiment of a horseshoe according to the invention.
Figure 10:
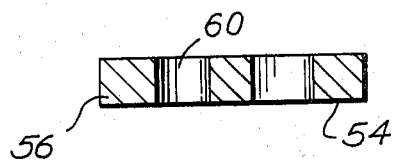
FIG. 10 is a transverse section of the horseshoe of FIG. 9 taken along line 10—10 of FIG. 9 in the direction of the arrows and showing the structure at a scale which is enlarged as compared to FIG. 9.

According to the embodiment of the invention which is illustrated in FIGS. 9 and 10, the elongated means 50 which forms the horseshoe of this embodiment is composed of a plurality of portions 52 which are integrally connected one to the next so as to form a continuous springy band 54. This band 54 may have the thickness illustrated in FIG. 10, and the elongated means 50 may be made of any suitable metal such as a suitable steel, as is the case with the above-described embodiments. Each of the portions 52 includes in this case also a lug 56 in the form of a body of substantially triangular configuration, but in the case of FIG. 9 the lugs 56 of the several portions 52 project radially from the continuous band 54 away from the central area 58 surrounded by the elongated means 50. These lugs 56 are respectively formed with the openings 60 through which nails may extend for fixing the horseshoe to a hoof. The end lugs 62 of FIG. 9 and 64 of FIG. 7 are of a somewhat different configuration than the remaining lugs of the horseshoes of FIGS. 7 and 9 but do not in any way interfere with the expansion and contraction of the horseshoe to alleviate the above problems described in connection with FIGS. 1–4, as is clear from the comparison of the solid and dot-dash line configuration of the horseshoe of FIG. 7. Thus, with the embodiments of FIGS. 7–10, except for the pair of opposed free end portions 62 of FIG. 9 and 64 of FIG. 7, the entire horseshoe consists in each embodiment of the series of identical portions 40 in FIG. 7 and 52 in FIG. 9, identically interconnected one to the next between the opposed free end portions.

Figure 11:
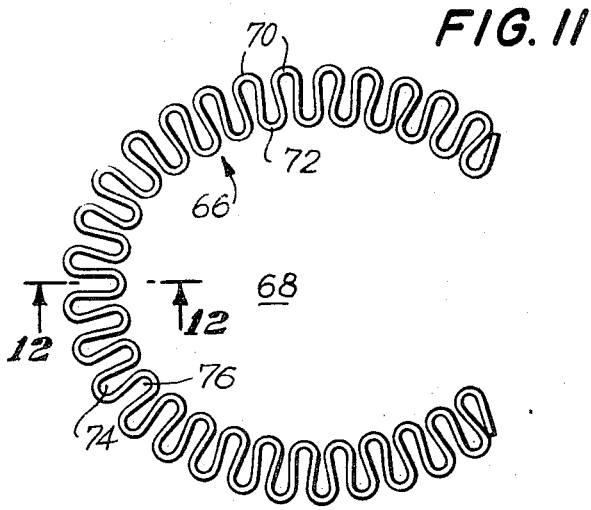
FIG. 11 is an illustration of yet another embodiment of a horseshoe according to the invention.
Figure 12:
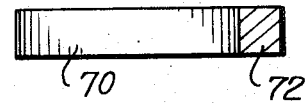
FIG. 12 is a transverse section of the structure of FIG. 11 taken along line 12—12 of FIG. 11 in the direction of the arrows and showing the structure at an enlarged scale as compared to FIG. 11.

According to the embodiment of the invention which is illustrated in FIGS. 11 and 12, the elongated means 66 which forms the horseshoe of this embodiment is in the form of an elongated strip of spring steel, for example, which is bent in the manner shown in FIG. 11 so that one edge of the strip will engage the wall of the hoof. This elongated means 66 surrounds a central area 68 and is composed of a plurality of portions 70 each of which is in the form of a loop which is itself of a substantially U-shaped configuration, with these loops respectively projecting radially from the central area 68. The several successive loops 70 are interconnected by the parts 72 of the continuous springy band which are situated between the successive loop portion 70 and which are integral therewith, so that in this way a single unitary band which will have the configuration shown in FIGS. 11 and 12 will form a horseshoe according to the invention which can yield radially away from and back toward the central area 68 so as to solve the problem discussed above in connection with FIGS. 1–4. Thus, with the embodiment of FIGS. 11 and 12 it is also clear that except for the terminations at the pair of opposed free ends shown at the right in FIG. 11, the entire horseshoe consists of the series of identical portions 70 which are identically interconnected one to the next by the parts 72.

It will be noted that with the above structure of FIGS. 11 and 12, the several loop portions 70 form openings 74 through which nails may extend for fastening the horseshoe to a hoof. If desired, however, nails may extend through loops 76 formed by the inner connecting parts 72 which interconnect the successive loop portions 70.

It is thus apparent that with the structure of the invention an exceedingly simple and inexpensive horseshoe is provided. At the same time any of the above-described horseshoes of the invention are capable of flexing so as to expand with a hoof as it grows in the manner described above in connection with FIGS. 1 and 3 and so as to conform to the change in configuration of the hoof wall which takes place in response to impact forces, as described above in connection with FIG. 4. As a result the shear forces and stresses resulting from impact forces as well as growth, as previously encountered with conventional rigid horseshoes, are capable of being absorbed in a highly effective manner so as to improve the health of the animal and prevent problems from developing.

What is claimed is:

1. A horseshoe comprising elongated means of substantially U-shaped configuration adapted to be attached to a hoof, said elongated means being composed of a pair of opposed free end portions and a series of identical portions distributed successively one after the other along said elongated means from one of said free end portions to the other of said free end portions, and said portions being directly interconnected in an identical manner one to the next for movement with respect to each other substantially radially toward and away from a central area around which said elongated means extends, so that said elongated means can expand and contract away from and toward said central area in response to impact forces and so that said elongated means can expand in conformity with growth of the hoof to which said elongated means is attached, said series of identical portions and pair of opposed free end portions all of which are identically interconnected with each other forming the entire horseshoe, said portions of said elongated means being hingedly connected to each other, and said portions of said elongated means overlapping each other and being formed at their overlapping portions with aligned openings, said elongated means including tubular hinge elements extending through the aligned openings of said portions for hingedly connecting them to each other while permitting nails to extend through said hinge elements for fastening the elongated means to a hoof.

2. The combination of claim 1 and wherein said portions are each of an arcuate configuration.

3. A horseshoe comprising elongated means of substantially U-shaped configuration adapted to be attached to a hoof, said elongated means being composed of a pair of opposed free end portions and a series of identical portions distributed successively one after the other along said elongated means from one of said free end portions to the other of said free end portions, and said portions being directly interconnected in an identical manner one to the next for movement with respect to each other substantially radially toward and away from a central area around which said elongated means extends, so that said elongated means can expand and contract away from and toward said central area in response to impact forces and so that said elongated means can expand in conformity with growth of the hoof to which said elongated means is attached, said series of identical portions and pair of opposed free end portions all of which are identically interconnected with each other forming the entire horseshoe, said portions of said elongated means being integrally connected one to the next and together forming in part an elongated springy band, said portions respectively including lugs integral with and projecting radially from said band and said lugs having distant from said band portions which are wider than those portions of said lugs which are situated directly next to said band so that the distance between said lugs along said band is greater than the distance between the portions of said lugs which are distant from said band.

4. The combination of claim 3 and wherein said lugs are respectively formed with openings through which nails may extend for fastening said elongated means to a hoof.

5. The combination of claim 3 and wherein said lugs project inwardly from said band and are situated between the latter and said central area.

6. The combination of claim 3 and wherein said lugs project radially from said band away from said central area with said band being situated between said central area and said band.

7. A horseshoe comprising elongated means of substantially U-shaped configuration adapted to be attached to a hoof, said elongated means being composed of a pair of opposed free end portions and a series of identical portions distributed successively one after the other along said elongated means from one of said free end portions to the other of said free end portions, and said portions being directly interconnected in an identical manner one to the next for movement with respect to each other substantially radially toward and away from a central area around which said elongated means extends, so that said elongated means can expand and contract away from and toward said central area in response to impact forces and so that said elongated means can expand in conformity with growth of the hoof to which said elongated means is attached, said series of identical portions and pair of opposed free end portions all of which are identically interconnected with each other forming the entire horseshoe, said portions of said elongated means being integrally connected to each other and respectively in the form of loops of a continuous band in which said loops are themselves of a substantially U-shaped configuration and extend substantially radially with respect to said central area, successive loops of said band being integrally connected one to the next to form a springy elongated means capable of expanding and contracting with said loops themselves defining openings through which nails may extend for fastening said elongated means to a hoof.

\* \* \* \* \*